Aug. 2, 1955

A. TRÖNDLE 2,714,412

MACHINE TOOLS

Filed Aug. 17, 1951

INVENTOR
Alois Tröndle

BY
Young, Emery & Thompson
ATTORNEYS

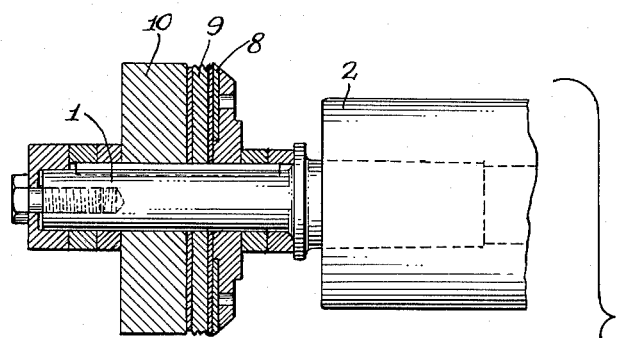
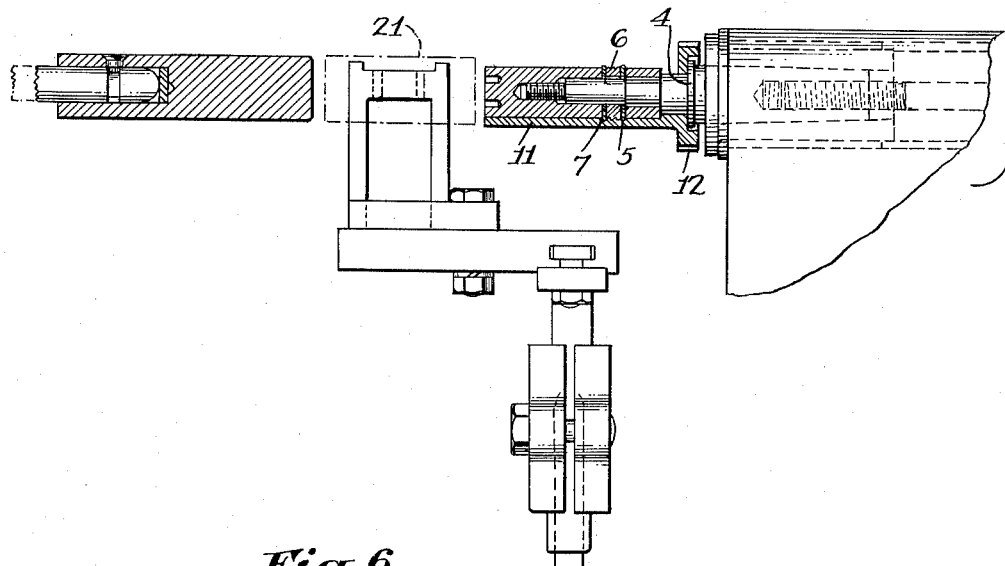
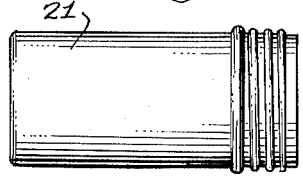

United States Patent Office 2,714,412
Patented Aug. 2, 1955

2,714,412

MACHINE TOOLS

Alois Tröndle, Goppingen, Wurttemberg, Germany, assignor to L. Schuler, A.-G., Goppingen, Wurttemberg, Germany, a corporation of Germany Application August 17, 1951, Serial No. 242,307

Claims priority, application Germany August 30, 1950

5 Claims. (Cl. 153—2)

This invention relates to machine tools for simultaneously creasing and pressing screwthreads and cutting the one end, for example into aluminum sleeves or tubes, particularly to machines of this type having an overhead pressure spindle.

According to the present invention it is an object to devise a machine comprising a sleeve rotatably mounted on a tool mandrel on which the work piece is placed, which sleeve has a slot or window for penetration of other tool members arranged on the pressure spindle, said sleeve being driven by the same drive means which effects the raising and lowering of the pressure spindle, for example, a pull rod which rocks a bearing bracket carrying the pressure spindle.

By means of this mechanism the waste material resulting from the cutting can be removed and ejected from the machine without obstruction. Such waste material will deposit only on the smooth sleeve provided according to the invention. By these means a combination of the creasing, cutting and screwthread impressing devices is rendered practicable and reliable in operation.

In a previous machine for this purpose locking the sleeve member according to the present invention, the waste material produced by cutting remained behind after removal of the workpiece from the tool mandrel, usually adhering to the projecting creasing and screwthread impressing means. This disadvantage is overcome by means of the present invention. It has also been proposed to provide a fixed intermediate sleeve in such machines but in such prior construction the pressure spindle or the tool roller had to operate laterally which resulted in a more complicated and less reliable mechanism. In a preferred form of construction according to the invention the sleeve has a row of teeth engaging teeth of a pivoted toothed segment driven by means of a link which may be adjustably connected to the pull rod which operates the bearing bracket carrying the pressure spindle. The drawing shows by way of example a construction of machine according to the invention. In the drawing, Figure 1 is a perspective view of the part of the machine to which the invention is applied, showing the position of the parts during ejection of a finished blank from the machine.

Figure 5 is an enlarged view, partly in section, of part of the mechanism shown in Figure 1.

Figure 6 is a side view of a finished work piece.

Figure 1:
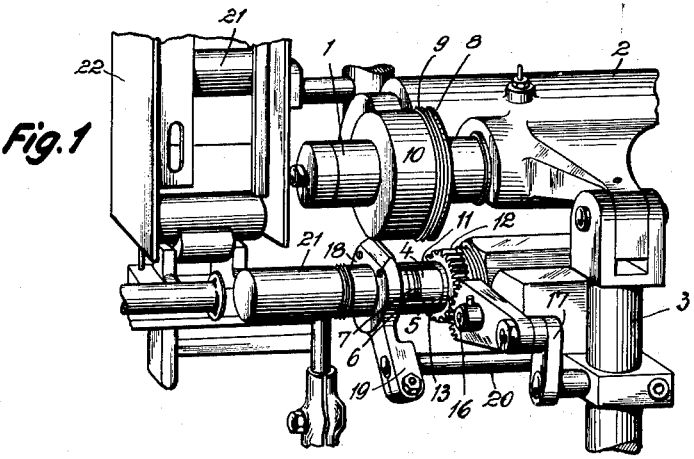

The machine illustrated has an upper pressure spindle 1 which is journalled in a bearing bracket 2, which bracket can rock upon a shaft, not shown, parallel to the pressure spindle and behind the same. The rocking of the bearing bracket 2 by means of which the pressure spindle 1 is raised and lowered, is effected by a pull rod 3. In the machine frame there is also journalled below and parallel to the pressure spindle 1, a tool mandrel 4 on which are secured a lower cutter anvil 5, a lower screwthread roll 6, and a lower creasing roll 7, which together form the lower tool. On the pressure spindle 1 are secured the upper tools, namely, an upper cutter 8, a screwthread roll anvil 9, and a creasing or pressing roll 10, together forming the upper tool.

Rotatably mounted on the tool mandrel is the intermediate sleeve 11 according to the present invention, provided at one end with gear teeth 12 and having from the gear 12 and extending to the end opposite the gear an opening or cut-away segment 13. The opening 13 makes it possible for the upper tool 8, 9 and 10 to cooperate with the lower tool 5, 6 and 7 when a blank is in place between them on the mandrel 4 and sleeve 11, which will be clear from Figure 5. The gear 12 on the sleeve are adapted to mesh with teeth 14 of a segment lever 15 pivoted on a shaft 16 and connected by a link 17 to the pull rod 3, the link 17 having an adjustable connection to said rod 3.

Figure 2:
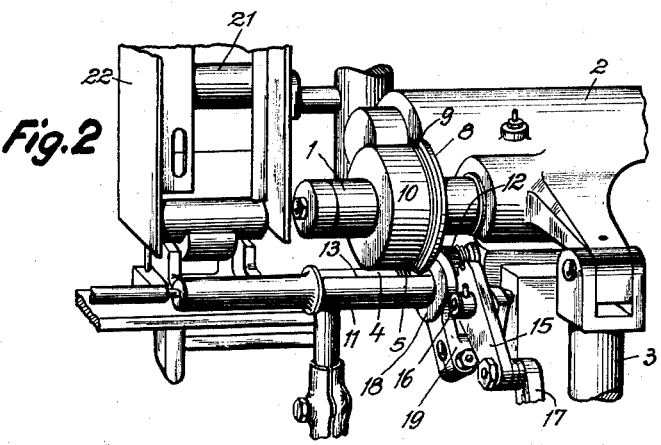
Figure 2 is a corresponding view showing the parts in the position before a blank is inserted.
Figure 3:
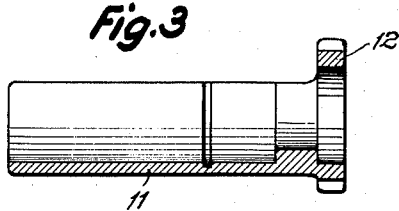
Figure 3 is a longitudinal sectional view of the sleeve, on a larger scale.
Figure 4:
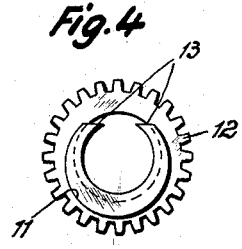
Figure 4 is an end view of the sleeve shown in Figure 3.

Around the sleeve 11 there is provided the head 18 of a scraper device 19 operated by and secured on a rod 20. The blank to be worked on, as for example an aluminum tube or shell 21, is fed from a magazine 22 on to the free end of the sleeve 11. As long as the upper pressure spindle 1 is in its upper position as shown in Fig. 1, the tube 21 will be inserted on the sleeve 11 of the mandrel 4 in a position in which the cut-away segment 13 is positioned to one side, Fig. 1. The tube 21 can thus be inserted unhindered by the tool on the mandrel 4 by sliding on the smooth surface of the sleeve 11 until the tube is in its position to be worked. While the upper pressure spindle 1 is moved downwardly by rocking the bearing bracket 2 by means of a pull and movement downwardly of the rod 3, the segment lever 15 is rotated clockwise, Figure 1, by the rod 3 in such a manner that the sleeve 11 is rotated to bring its opening 13 to the top, Figure 2 so that the tube can be worked by the tool of the mandrel. It is now possible for the upper and lower tools to operate upon an intervening blank, in the position shown in Figure 2, the blank itself being omitted for sake of clearness in this figure.

After termination of the working stroke the upper pressure spindle 1 is raised again to the upper position, which movement is accompanied by raising of the pull rod 3 and by the action of the segment lever 15, which turns the sleeve 11 into the position shown in Figure 1. The blanks and the waste material resulting from the cutting of the blank then lies on the upper side of the tool 4 and on the close smooth portion of the sleeve 11, so that it can be moved or stripped without hindrance from the tool by the stripper device 18 and 19 so that simultaneously the finished blank and waste end are moved into the position shown in Figure 1, from which they can be taken or fall off in any suitable manner.

It is, of course, obvious that the tool in addition to pressing screwthreads into tubes, it is equally possible to press grooves or the like by means of corresponding tool elements.

I claim:

1. A machine tool for simultaneously pressing screwthreads and cutting the ends from metallic tube and cylindrical container blanks, comprising an upper spindle rotatably mounted and having upper tool members thereon in the form of pressing and cutting tools, a bearing bracket pivotally mounted and rotatably carrying the upper spindle, a lower tool mandrel rotatably mounted below the upper spindle and having secured thereon tool members in the form of pressing and cutting tools to cooperate with the pressing and cutting tools of the upper spindle, a pull rod connected to the bearing bracket to move the upper tool members adjacent to and in cooperation with the lower tool members by rotation of the bearing bracket around its pivot, a sleeve mounted for slight rotation on the lower tool mandrel and having means at one end to effect its slight rotation and a longitudinal slot extending from the last-mentioned means to the other end thereof, and means connected to the pull rod and to the means on the sleeve to effect slight rotation of the sleeve upon each movement of the pull rod, said longitudinal slot in the sleeve being directed sidewardly when the pressing and cutting tools are spaced from each other but upon actuation of the pull rod to bring the tools toward each other with a blank on the sleeve and mandrel, the sleeve will be slightly rotated on the lower mandrel to bring the slot in a position facing upwardly so that the tools can act on the blank in cooperating relationship.

2. A machine tool according to claim 1, in which the means on the sleeve to effect its slight rotation comprises a gear and in which the means connected to the pull rod include a pivoted lever having a gear segment thereon meshing with the gear on the sleeve.

3. A machine tool according to claim 1, in which means are provided on the mandrel operable to strip both the finished blank and the cut end from the mandrel.

4. A machine tool according to claim 1, in which a stripping device is provided having a head member cooperating with the sleeve and operable after the tools have completed their operation to slide both the finished blank and cut end from the sleeve and mandrel.

5. A machine tool according to claim 1, in which the means on the sleeve to effect its slight rotation comprises a gear and in which the means connected to the pull rod include a pivoted lever having a gear segment thereon meshing with the gear on the sleeve, said last-mentioned means including adjustable means on the pull rod to thereby adjust the rotary motion of the sleeve.

References Cited in the file of this patent

UNITED STATES PATENTS

| | | |
|---|---|---|
| 286,293 | Gront | Oct. 9, 1883 |
| 1,415,099 | Kohler | May 9, 1922 |
| 1,534,999 | Watson | Apr. 21, 1925 |
| 2,312,225 | Wilkinson | Feb. 23, 1943 |
| 2,444,506 | Hammer | July 6, 1948 |
| 2,465,253 | Montelione | Mar. 22, 1949 |
| 2,583,521 | Temple | Jan. 22, 1952 |